United States Patent
Appia (10) Patent No.: US 11,048,957 B2
(45) Date of Patent: *Jun. 29, 2021

(54) STRUCTURED LIGHT DEPTH IMAGING UNDER VARIOUS LIGHTING CONDITIONS

(71) Applicant: Texas Instruments Incorporated, Dallas, TX (US)

(72) Inventor: Vikram VijayanBabu Appia, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,472

(22) Filed: Aug. 22, 2018

(65) Prior Publication Data

US 2018/0357502 A1    Dec. 13, 2018

Related U.S. Application Data

(63) Continuation of application No. 14/296,172, filed on Jun. 4, 2014, now Pat. No. 10,089,739.
(Continued)

(51) Int. Cl.
*G06K 9/20* (2006.01)
*G01C 11/02* (2006.01)
(Continued)

(52) U.S. Cl.
CPC .......... *G06K 9/2036* (2013.01); *G01C 11/025* (2013.01); *G06K 9/00201* (2013.01);
(Continued)

(58) Field of Classification Search
CPC . G06T 7/521; G06T 7/11; G06T 7/136; G06T 2207/20012; G06K 9/00201; G06K 9/2036; G06K 9/50; G01C 11/025
See application file for complete search history.

(56) References Cited

U.S. PATENT DOCUMENTS 7,916,932 B2 *   3/2011   Lee ...................... G06K 9/2036
                                                     382/154
7,929,752 B2 *   4/2011   Je ....................... G01B 11/2509
                                                     382/162
(Continued)

OTHER PUBLICATIONS

Scharstein et al., "High-Accuracy Stereo Depth Maps Using Structured Light", Proceedings of the 2003 IEEE Computer Society Conference on Computer Vision and Pattern Recognition, vol. 1, pp. 1-9 (Year: 2003).*

(Continued)

*Primary Examiner* — Nay A Maung
*Assistant Examiner* — Jose M Torres
(74) *Attorney, Agent, or Firm* — Ebby Abraham; Charles A. Brill; Frank D. Cimino (57) ABSTRACT

A method of image processing in a structured light imaging system is provided that includes receiving a captured image of a scene, wherein the captured image is captured by a camera of a projector-camera pair, and wherein the captured image includes a binary pattern projected into the scene by the projector, applying a filter to the rectified captured image to generate a local threshold image, wherein the local threshold image includes a local threshold value for each pixel in the rectified captured image, and extracting a binary image from the rectified captured image wherein a value of each location in the binary image is determined based on a comparison of a value of a pixel in a corresponding location in the rectified captured image to a local threshold value in a corresponding location in the local threshold image.

24 Claims, 9 Drawing Sheets

Related U.S. Application Data (60) Provisional application No. 61/840,539, filed on Jun. 28, 2013.

(51) Int. Cl.
  *G06K 9/00* (2006.01)
  *G06K 9/50* (2006.01)
  *G06T 7/521* (2017.01)
  *G06T 7/11* (2017.01)
  *G06T 7/136* (2017.01)

(52) U.S. Cl.
  CPC .................. *G06K 9/50* (2013.01); *G06T 7/11* (2017.01); *G06T 7/136* (2017.01); *G06T 7/521* (2017.01); *G06T 2207/20012* (2013.01)

(56) References Cited

U.S. PATENT DOCUMENTS

| | | | | |
|---|---|---|---|---|
| 8,805,057 | B2* | 8/2014 | Taguchi | G06T 7/586 |
| | | | | 382/154 |
| 9,098,908 | B2* | 8/2015 | Kirk | G06T 7/593 |
| 9,361,698 | B1* | 6/2016 | Song | G06T 7/521 |
| 9,606,237 | B2* | 3/2017 | Herschbach | G01S 17/48 |
| 9,626,568 | B2* | 4/2017 | Tang | G06T 7/246 |
| 2004/0105580 | A1 | 6/2004 | Hager et al. | |
| 2007/0165246 | A1 | 7/2007 | Kimmel | |
| 2007/0177160 | A1 | 8/2007 | Sasaki | |
| 2008/0118143 | A1 | 5/2008 | Gordon et al. | |
| 2008/0159595 | A1 | 7/2008 | Park et al. | |
| 2009/0322859 | A1 | 12/2009 | Shelton et al. | |
| 2010/0074532 | A1 | 3/2010 | Gordon et al. | |
| 2012/0086803 | A1 | 4/2012 | Malzbender et al. | |
| 2012/0176478 | A1 | 7/2012 | Wang et al. | |
| 2012/0237112 | A1 | 9/2012 | Veeraraghavan et al. | |
| 2013/0135441 | A1 | 5/2013 | Deng et al. | |
| 2014/0002610 | A1 | 1/2014 | Xi et al. | |
| 2014/0132722 | A1 | 5/2014 | Martinez Bauza et al. | |
| 2014/0247326 | A1 | 9/2014 | Hébert et al. | |
| 2014/0313292 | A1 | 10/2014 | Xiong et al. | |

OTHER PUBLICATIONS

Yang et al., "Depth Acquisition from Density Modulated Binary Patterns", 2013 IEEE Conference on Computer Vision and Pattern Recognition, Jun. 23-28, 2013, pp. 25-32.

Maurice et al., "A pattern framework driven by the Hamming distance for structured light-based reconstruction with a single image", 2011 IEEE Conference on Computer Vision and Pattern Recognition Jun. 20-25, 2011, pp. 2497-2504.

Vuylsteke et al., "Range Image Acquisition with a Single Binary-Encoded Light Pattern", IEEE Transactions on Pattern Analysis and Machine Intelligence, vol. 12 No. 2, Feb. 1990, pp. 148-164.

Salvi et al., "Pattern codification strategies in structured light systems", Pattern Recognition, vol. 37 No. 4, Apr. 2004, pp. 827-849.

Anderson et al., "Augmenting Depth Camera Output Using Photometric Stereo", In Machine Vision Applications, Jun. 2011, pp. 1-4.

Sato, "Range imaging based on moving pattern light and spatio-temporal matched filter", International Conference on Image Processing, 1996, pp. 33-36.

* cited by examiner

STRUCTURED LIGHT DEPTH IMAGING UNDER VARIOUS LIGHTING CONDITIONS

CROSS-REFERENCE TO RELATED APPLICATIONS

The present application is a continuation of and claims priority to U.S. patent application Ser. No. 14/296,172 filed on Jun. 4, 2014, which claims benefit of U.S. Provisional Patent Application Ser. No. 61/840,539, filed Jun. 28, 2013, both of which are incorporated by reference herein in their entirety.

BACKGROUND OF THE INVENTION

Field of the Invention

Embodiments of the present invention generally relate to improved structured light depth imaging under various lighting conditions.

Description of the Related Art

In structured light imaging systems, a projector-camera pair is used to estimate the three-dimensional (3D) depth of a scene and shape of objects in the scene. The principle behind structured light imaging is to project patterns on objects/scenes of interest and capture images with the projected pattern. The depth is estimated based on variations of the pattern in the captured image in comparison to the projected pattern.

Many real-time structured light imaging systems use a binary projection pattern. To generate 3D images using visible structured light patterns, the images are captured in a dark room with very little interfering light. The signal-to-noise ratio (SNR) in such scenarios is very high. A second alternative is to use infrared (IR) structured light patterns and use sensors with notch filters tuned to the particular wavelength of the projected infrared (IR) pattern. This setup filters out a majority of the interfering ambient light to increase the SNR, thus allowing the imaging system to be used indoors with some ambient light.

But current IR projection pattern based techniques will fail in presence of bright interfering light with a matching IR frequency component. For example, real-time structured light devices such as Microsoft Kinect fail in the presence of bright interfering light such as sunlight coming through a window into the room where the device is being used. Sunlight contains light of all frequencies and thus has some interfering light which matches the wavelength of the projected pattern. Further, the optical properties of the objects present in the scene also influence the quality of the pattern observed by the camera, e.g., white objects reflect more light than black objects.

SUMMARY

Embodiments of the present invention relate to methods, apparatus, and computer readable media for improving structured light depth imaging under various lighting conditions. In one aspect, a method of image processing in a structured light imaging system is provided that includes receiving a captured image of a scene, wherein the captured image is captured by a camera of a projector-camera pair in the structured light imaging system, and wherein the captured image includes a binary pattern projected into the scene by the projector, rectifying the captured image to generated a rectified captured image, applying a filter to the rectified captured image to generate a local threshold image, wherein the local threshold image includes a local threshold value for each pixel in the rectified captured image, and extracting a binary image from the rectified captured image wherein a value of each location in the binary image is determined based on a comparison of a value of a pixel in a corresponding location in the rectified captured image to a local threshold value in a corresponding location in the local threshold image.

In one aspect, a structured light imaging system is provided that includes an imaging sensor component configured to capture images of a scene, a projector component configured to project a binary pattern into the scene, means for rectifying a captured image to generated a rectified captured image, means for applying a filter to the rectified captured image to generate a local threshold image, wherein the local threshold image comprises a local threshold value for each pixel in the rectified captured image, and means for extracting a binary image from the rectified captured image wherein a value of each location in the binary image is determined based on a comparison of a value of pixel in a corresponding location in the rectified captured image to a local threshold value in a corresponding location in the local threshold image.

In one aspect, a non-transitory computer-readable medium is provide that stores instructions that, when executed by at least one processor in a structured light imaging system, cause a method of image processing to be performed. The method includes receiving a captured image of a scene, wherein the captured image is captured by a camera of a projector-camera pair in the structured light imaging system, and wherein the captured image includes a binary pattern projected into the scene by the projector, rectifying the captured image to generated a rectified captured image, applying a filter to the rectified captured image to generate a local threshold image, wherein the local threshold image includes a local threshold value for each pixel in the rectified captured image, and extracting a binary image from the rectified captured image wherein a value of each location in the binary image is determined based on a comparison of a value of a pixel in a corresponding location in the rectified captured image to a local threshold value in a corresponding location in the local threshold image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

As previously mentioned, many current structured light imaging systems fail in the presence of bright interfering light with a matching infrared (IR) frequency component. Most structured light imaging techniques may be classified into two categories based on the number of images captured to estimate depth: single pattern techniques and multi-pattern techniques. Real time structured light imaging systems typically use single pattern techniques because multi-pattern techniques require capturing of multiple images at high-speed. Further, typical projection patterns may be classified as binary or continuous patterns. Due to the computation complexity involved in extracting depth from continuous patterns, binary patterns are used in most commercial real-time structured light imaging applications.

Figure 1:
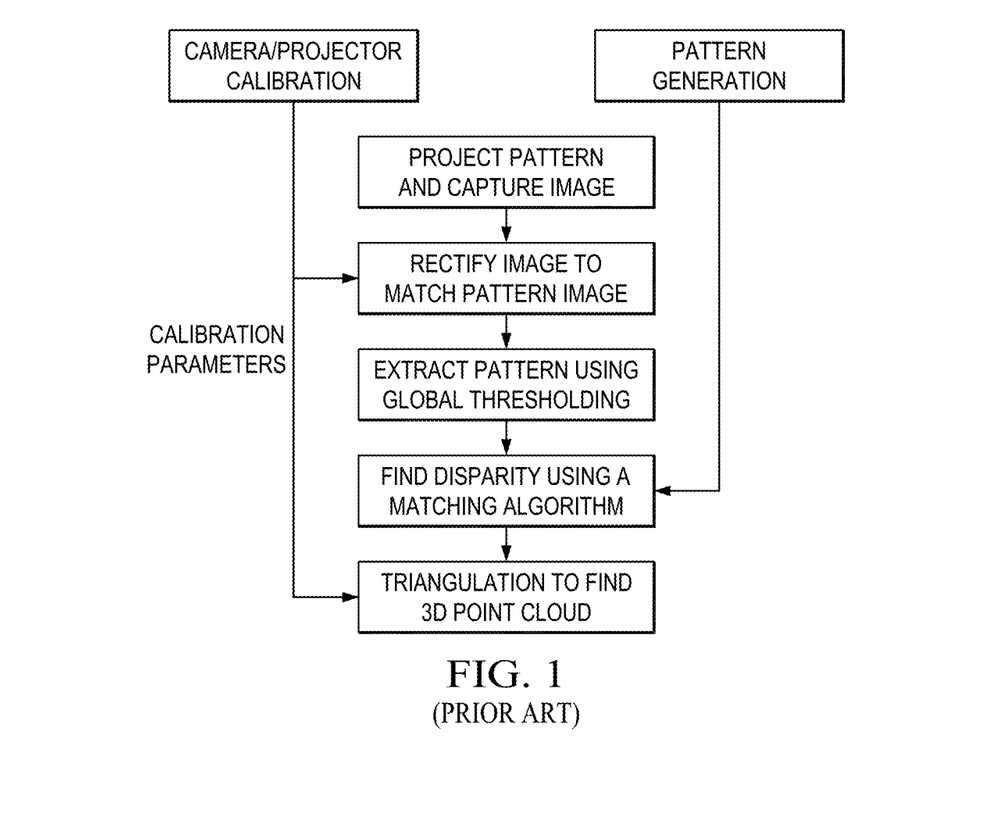
FIG. 1 is a flow diagram of a prior method.

FIG. 1 is a flow diagram of a prior art method for computing a three dimensional (3D) point cloud in a real-time structured light imaging system using a single binary pattern. Pattern generation and camera-projector calibration are offline processes which are performed one time and need not be repeated for each image. The pattern generated is binary pattern. The remaining steps in the method are repeated for each image capture. In this method, the binary pattern is projected into the scene by the projector and an image is captured by the camera. The captured image is then rectified to match the dimensions of the projected pattern. The rectification is performed using the calibration parameters.

A binary image is then extracted from the rectified image using a global threshold. More specifically, a single global threshold is compared to each pixel in the rectified image. If a pixel in the rectified image has a value greater than this global threshold, then the corresponding location in the binary image is set to 1; otherwise, the corresponding location is set to 0. This binary image is then used to find a disparity map with the aid of a matching algorithm and the original projected binary pattern. After rectification, the problem of finding disparity is reduced to searching along the epipolar lines. Further, because a binary image is extracted from the captured image, matching the image to the pattern can be accomplished by measuring the Hamming distance. Triangulation is then performed to find the 3D point cloud, i.e., given a baseline between the camera and projector, the disparity map can be converted into depths using the rules of triangulation to determine the 3D point cloud.

The use of a simple global threshold to determine the pattern captured by the camera, i.e., to generate the binary image, is based on the assumption that the camera-projector pair is operating with a high SNR. Using a simple global threshold works well in dark rooms or with a controlled setup with tuned notch filters, where the SNR is high. If the scene is flushed by light with a wavelength that matches the projected pattern, the SNR of the captured pattern is significantly reduced, resulting in significant errors in the 3D point clouds.

Embodiments of the invention provide for using an adaptive threshold to extract a binary image from a captured image instead of using a global threshold. More specifically, a local threshold is computed for each pixel in a captured image based on the captured image, and the local thresholds are used to extract the binary image from the captured image. Using an adaptive threshold to extract the binary image makes the structured light imaging system more robust to the lighting conditions of the scene. The use of an adaptive threshold handles larger changes in illumination and variations in the optical properties of the objects in the scene, thus improving the range and accuracy of the structured light imaging system. Using an adaptive threshold can reduce the need for specifically designed optics and sensor frequency tuning, which can be an expensive and intricate process.

Figure 2:
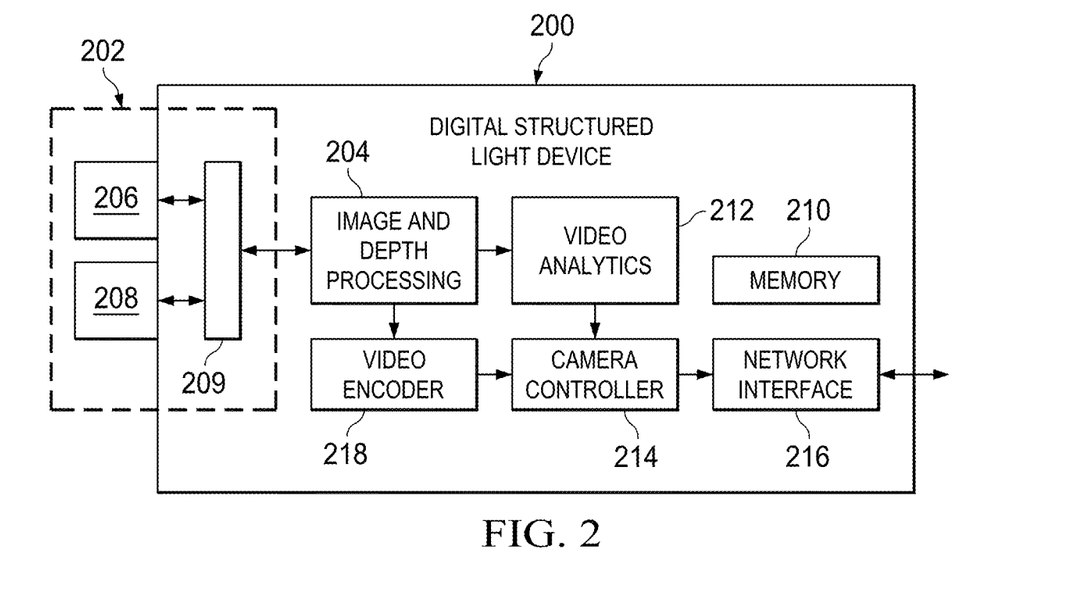
FIG. 2 is a block diagram of an example digital structured light device.

FIG. 2 is a block diagram of an example digital structured light device 200 configured to use an adaptive threshold as part of the processing of captured images. More specifically, the digital structured light device is configured to perform an embodiment of the method of FIG. 3 to generate depth images. As is explained in more detail in reference to FIG. 3, the method uses an adaptive threshold for extracting a binary image from a rectified captured image.

The digital structured light device 200 includes a structured light imaging system 202, an image and depth processing component 204, a video encoder component 218, a memory component 210, a video analytics component 212, a camera controller 214, and a network interface 216. The components of the camera 200 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 210 and executed by one or more processors (not specifically shown).

The structured light imaging system 202 includes an imaging sensor component 206, a projector component 208, and a controller component 209 for capturing images of a scene. The imaging sensor component 206 is an imaging sensor system arranged to capture image signals of a scene and the projector component 208 is a projection system arranged to project a pattern of light into the scene. The imaging sensor component 206 includes a lens assembly, a lens actuator, an aperture, and an imaging sensor. The projector component 208 includes a projection lens assembly, a lens actuator, an aperture, a light source, and projection circuitry. The structured light imaging system 202 also includes circuitry for controlling various aspects of the operation of the system, such as, for example, aperture opening amount, exposure time, synchronization of the imaging sensor component 206 and the projector component 208, etc. The controller component 209 includes functionality to convey control information from the camera controller 214 to the imaging sensor component 206, the projector component 208, to convert analog image signals from the imaging sensor component 206 to digital image signals, and to provide the digital image signals to the image and depth processing component 204.

In some embodiments, the imaging sensor component 206 and the projection component 208 may be arranged vertically such that one component is on top of the other, i.e., the two components have a vertical separation baseline. In some embodiments, the imaging sensor component 206 and the projection component 208 may be arranged horizontally such that one component is next to the other, i.e., the two components have a horizontal separation baseline.

The image and depth processing component 204 divides the incoming digital signal(s) into frames of pixels and processes each frame to enhance the image data in the frame. The processing performed may include one or more image enhancement techniques such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment on each of the left and right images.

The image and depth processing component 204 then uses the enhanced image data to generate a depth image, which may be converted to a 3D point cloud. A depth image is the two dimensional (2D) representation of a 3D point cloud. More specifically, the image and depth processing component performs the image processing steps of the method of FIG. 3 to generate a depth image, which may be converted to a 3D point cloud in some embodiments. The enhanced captured image is provided to the video encoder component 208 and the depth image and enhanced captured image are provided to the video analytics component 212.

The video encoder component 208 encodes the image in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 210 may be on-chip memory, external memory, or a combination thereof. Any suitable memory design may be used. For example, the memory component 210 may include static random access memory (SRAM), dynamic random access memory (DRAM), synchronous DRAM (SDRAM), read-only memory (ROM), flash memory, a combination thereof, or the like. Various components in the digital structured light device 200 may store information in memory in the memory component 210 as a video stream is processed. For example, the video encoder component 208 may store reference data in a memory of the memory component 210 for use in encoding frames in the video stream. The memory component 210 may also store calibration (rectification) parameters and the projected pattern image for use by the image and depth processing component 204 in performing the method of FIG. 3.

Further, the memory component 210 may store any software instructions that are executed by one or more processors (not shown) to perform some or all of the described functionality of the various components. Some or all of the software instructions may be initially stored in a computer-readable medium such as a compact disc (CD), a diskette, a tape, a file, memory, or any other computer readable storage device and loaded and stored on the digital structured light device 200. In some cases, the software instructions may also be sold in a computer program product, which includes the computer-readable medium and packaging materials for the computer-readable medium. In some cases, the software instructions may be distributed to the digital structured light device 200 via removable computer readable media (e.g., floppy disk, optical disk, flash memory, USB key), via a transmission path from computer readable media on another computer system (e.g., a server), etc.

The camera controller component 214 controls the overall functioning of the digital structured light device 200. For example, the camera controller component 214 may adjust the focus and/or exposure of the structured light imaging system 202 based on the focus quality and scene brightness, respectively, determined by the image and depth processing component 204. The camera controller component 214 also controls the transmission of the encoded video stream via the network interface component 216 and may control reception and response to camera control information received via the network interface component 216.

The network interface component 216 allows the digital structured light device 200 to communicate with other systems, e.g., a monitoring system, via a network such as, for example, a local area network (LAN), a wide area network (WAN) such as the Internet, a cellular network, any other similar type of network and/or any combination thereof. The network interface component 216 may use any suitable network protocol(s).

The video analytics component 212 analyzes the content of images in the captured video stream to detect and determine temporal events not based on a single image. The analysis capabilities of the video analytics component 212 may vary in embodiments depending on such factors as the processing capability of the digital structured light device 200, the particular application for which the digital structured light device is being used, etc. For example, the analysis capabilities may range from video motion detection in which motion is detected with respect to a fixed background model to people counting, detection of objects crossing lines or areas of interest, vehicle license plate recognition, object tracking, facial recognition, automatically analyzing and tagging suspicious objects in a scene, activating alarms or taking other actions to alert security personnel, etc.

Figure 3:
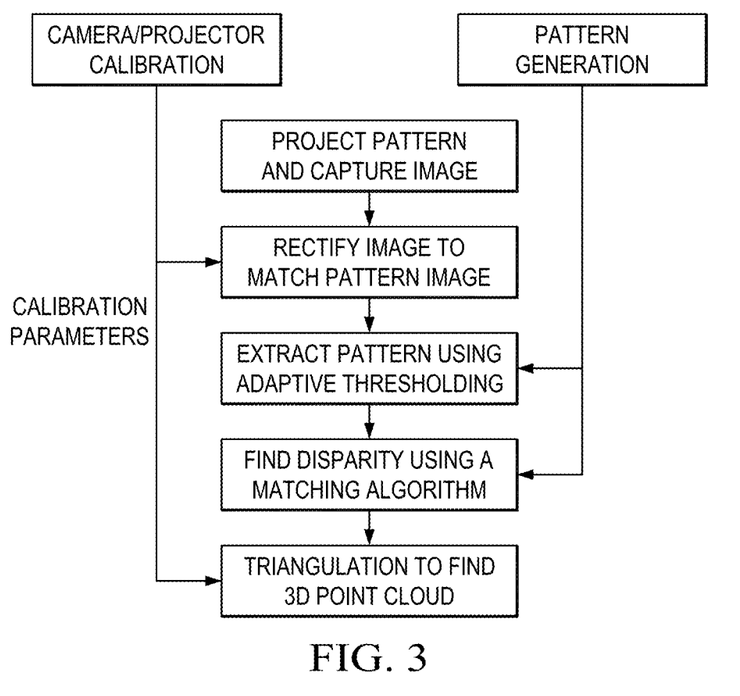
FIGS. 3 and 4 are flow diagrams of methods.

FIG. 3 is a flow diagram of a method for computing a three dimensional (3D) point cloud in a real-time structured light imaging system using a single binary pattern that may be performed, for example, by the digital structured light device 200 of FIG. 2. Pattern generation and camera-projector calibration are offline processes which are performed one time and need not be repeated for each image. The calibration provides calibration parameters that are used to rectify captured images and the pattern generation provides a suitable binary pattern to be projected by the projector. The remaining steps in the method are repeated for each image capture.

In this method, the binary pattern is projected into the scene by the projector and an image of the scene is captured by the camera. The captured image is then rectified to match the dimensions of the projected pattern. The rectification is performed using the calibration parameters. With either a horizontal or vertical component baseline, the field of view (FOV) of the camera of the projector-camera pair may be larger than that of the projector component. The projected pattern varies in the captured image along the direction (epipolar lines) of the camera-projector separation based on the depth of objects in a scene. Thus, a wider FOV is needed to capture the projected pattern irrespective of the depth of objects in the scene. Accordingly, rectification is performed on each captured image to correct for the FOV variation in the direction perpendicular to the component baseline. Among other operations, the rectification processing may include discarding any portions of the captured image that are outside the boundaries of the projected pattern A binary image is then extracted from the rectified image using an adaptive threshold, i.e., using an embodiment of the method of FIG. 4. As is explained in more detail in reference to FIG. 4, a local threshold is determined for each pixel in the captured image and these local thresholds are used to extract the binary image.

The binary image is then used to find a disparity map with the aid of a matching algorithm and the original projected binary pattern. Any suitable matching algorithm may be used. After rectification, the problem of finding disparity is reduced to searching along the epipolar lines. Further, because a binary image is extracted from the captured image, matching the image to the pattern can be accomplished, for example, by measuring the Hamming distance. Triangulation is then performed to find the 3D point cloud, i.e., given a baseline between the camera and projector, the disparities can be converted into depths using the rules of triangulation to determine the 3D point cloud.

Figure 4:
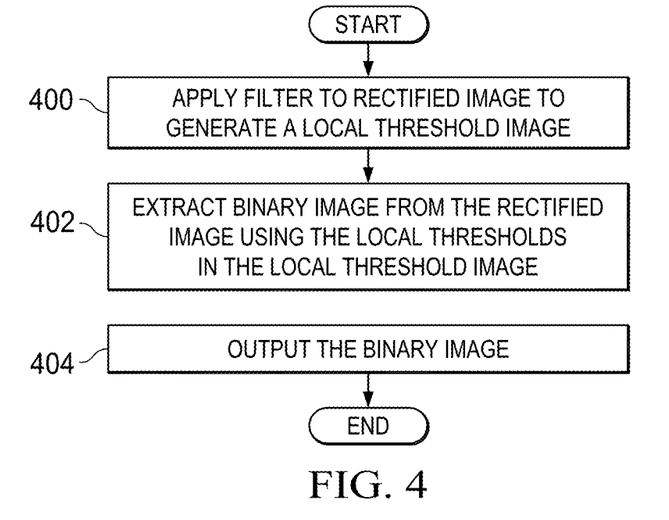

FIG. 4 is a flow diagram of a method for extracting a binary image from a rectified image using an adaptive threshold. Initially, a filter is applied 400 to the rectified image to generate local threshold values for each pixel in the rectified image, i.e., to generate a local threshold image in which each location in the local threshold image contains a local threshold value for a pixel in the corresponding location in the rectified image. The particular filter used may be empirically determined and may depend on the distribution of ones and zeros in the projected binary pattern image. For example, if the binary pattern has an equal distribution of ones and zeros, a local mean is a good candidate for a local threshold value. Thus, the filter used may be, for example, a local circular averaging filter or local box-average filter, e.g., a 5×5 box averaging filter. The filter kernel sizes may vary depending on the information (density) in the binary pattern. In some embodiments, a bilateral filter or a suitable 2D low-pass filter such as a 2D Gaussian filter may be used.

After the local threshold image is generated, the binary image is extracted 402 from the rectified image using the local threshold values in the local threshold image. More specifically, each pixel in the rectified image is compared to the local threshold value in the corresponding location in the local threshold image. If a pixel in the rectified image has a value greater than the corresponding local threshold, then the corresponding location in the binary image is set to 1; otherwise, the corresponding location is set to 0. Once generated, the binary image is output 404 for further processing.

Figure 5A:
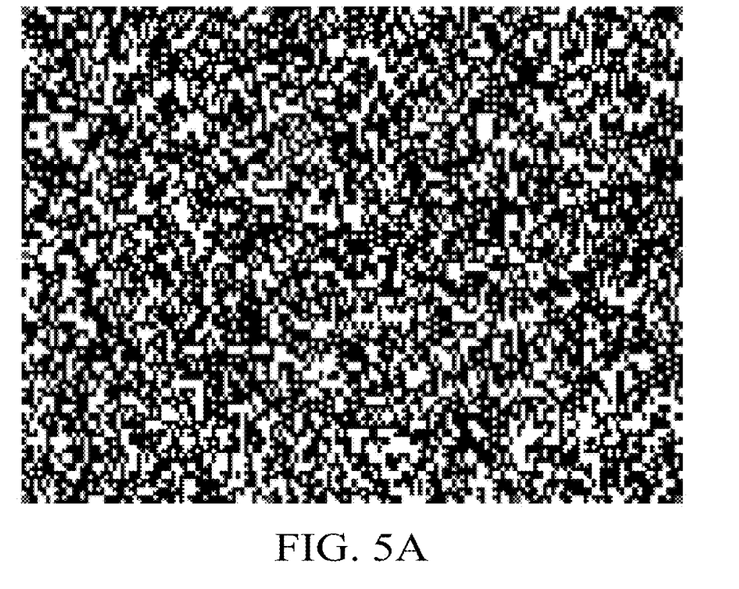
FIGS. 5A-5D, 6A-6D, 7A-7C, and 8A-8C are examples.
Figure 5B:
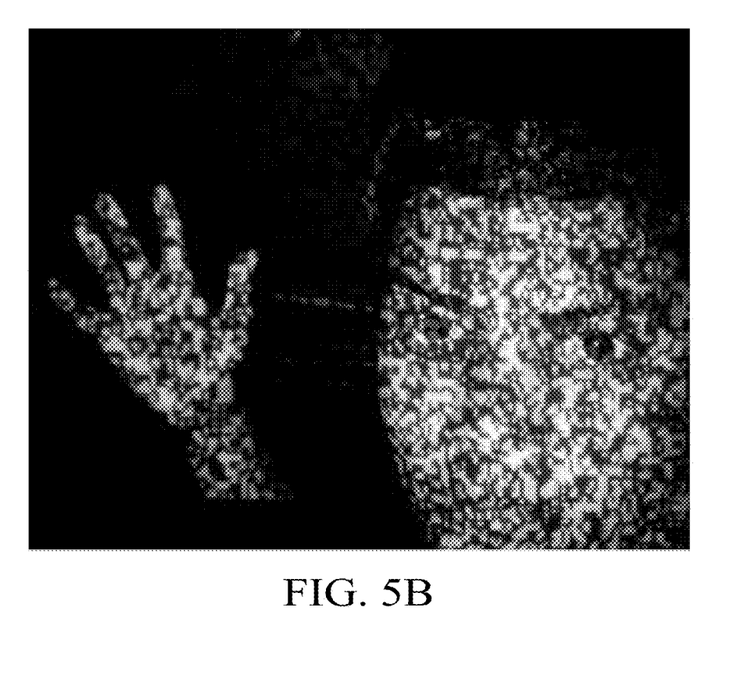
Figure 5C:
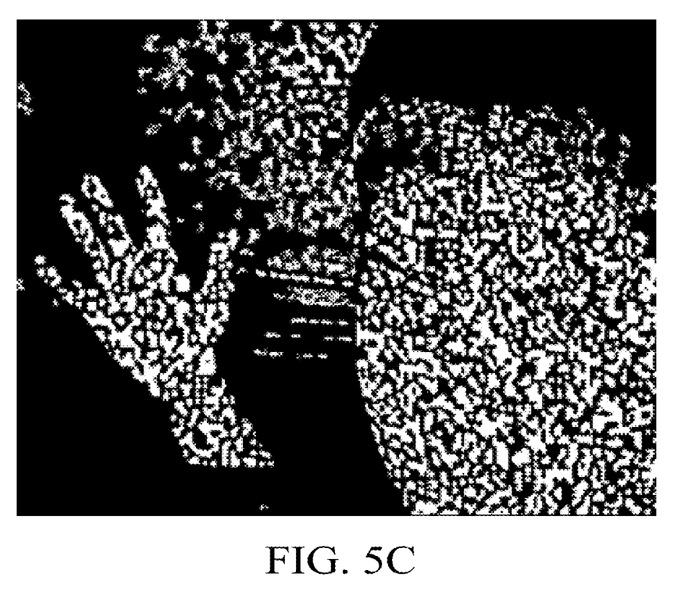
Figure 5D:
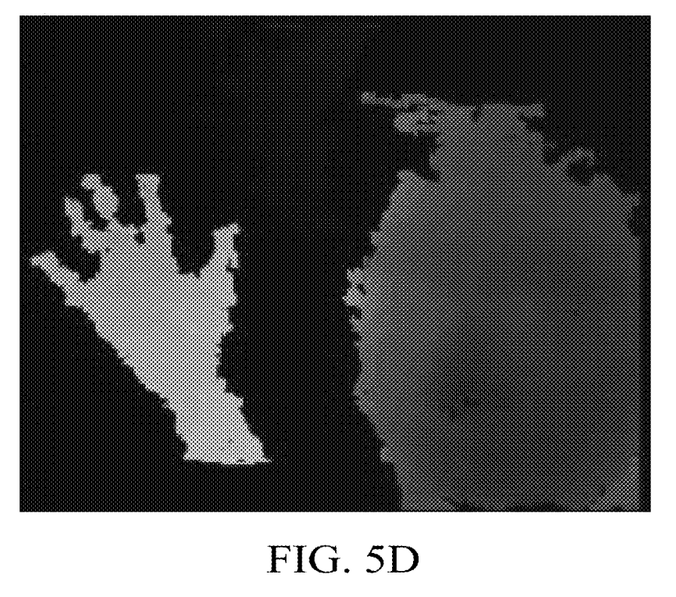

FIGS. 5A-5D, 6A-6D, 7A-7C, and 8A-8C examples illustrating the efficacy of using an adaptive threshold rather than a global threshold. FIGS. 5A-5D are an example in which the projected binary pattern has an equal distribution of ones and zeros and a local circular averaging filter was used to generate the local threshold image. FIG. 5A shows the projected binary pattern and FIG. 5B shows the captured image. FIG. 5C shows the binary image extracted from the captured image of FIG. 5B use an adaptive threshold. FIG. 5D shows the depth map calculated by matching the binary image with the projected binary pattern image. FIGS. 7A-7C show the result of using a global threshold rather than an adaptive threshold for the extraction of the binary image. FIG. 7A is the captured image, i.e., the image of FIG. 5A. FIG. 7B shows the binary image extracted from the captured image of FIG. 7A using a global threshold. FIG. 7C shows the depth map calculated by matching the binary image with the projected binary pattern image.

Note that the depth map of FIG. 5D is much better than that of FIG. 7C. FIG. 5B was captured in a dark room with zero ambient light conditions. The errors seen on the face using the global threshold (FIGS. 7B and 7C) are due to sub-surface scattering in which light enters beneath the surface of the object and is scattered within, thus causing a blurred pattern image (visible on the forehead and cheeks). This error was eliminated using the adaptive threshold.

Figure 6A:
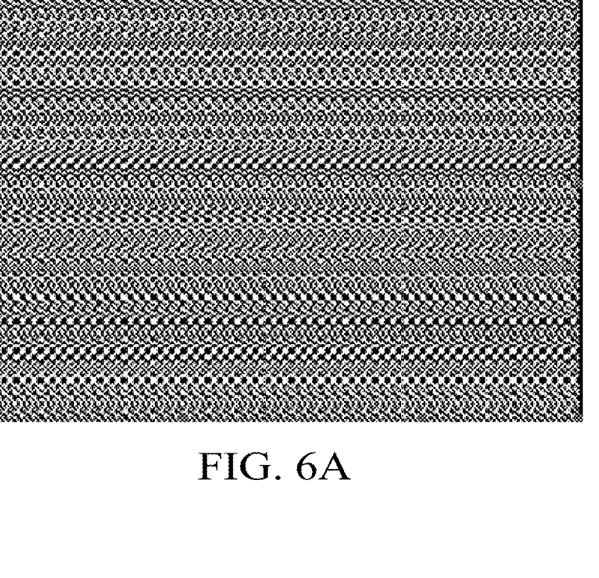
Figure 6B:
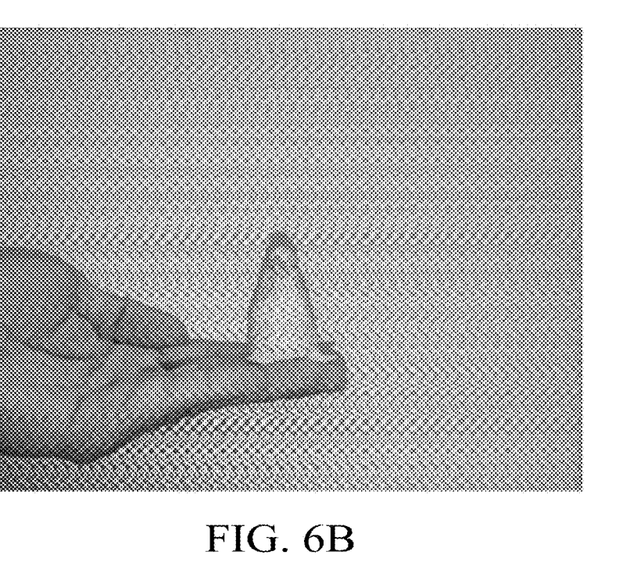
Figure 6C:
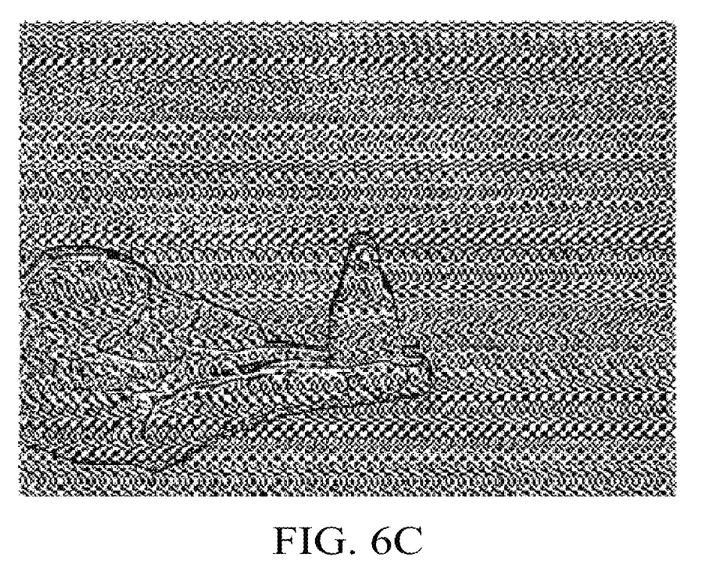
Figure 6D:
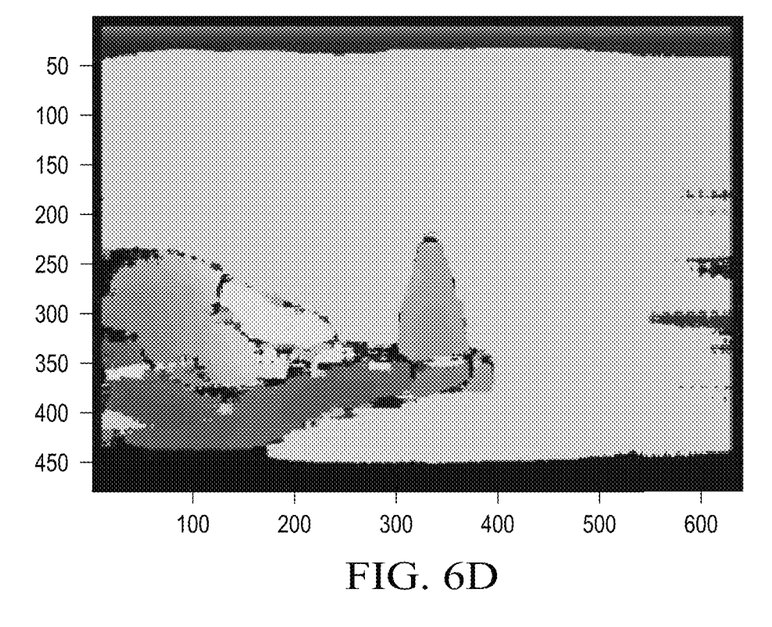
Figure 7A:
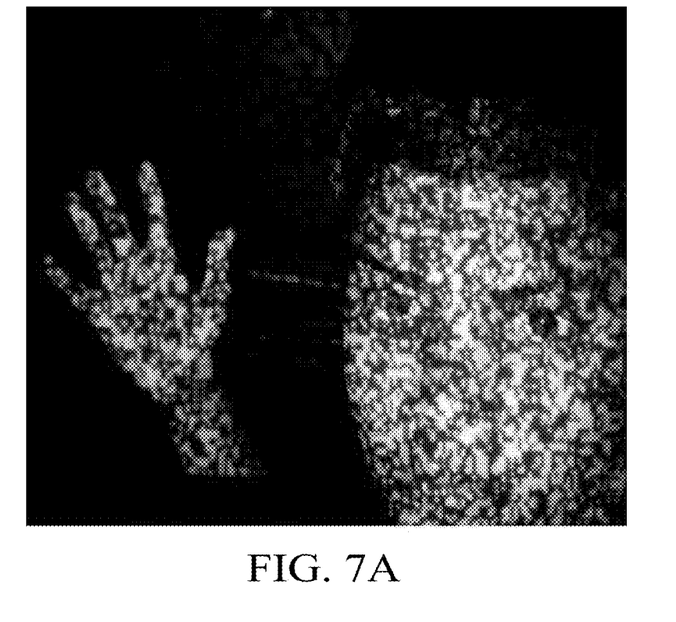
Figure 7B:
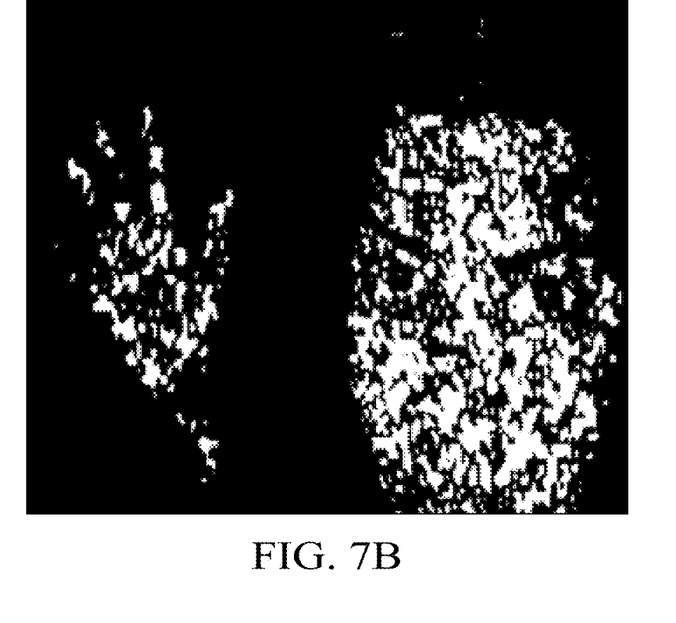
Figure 7C:
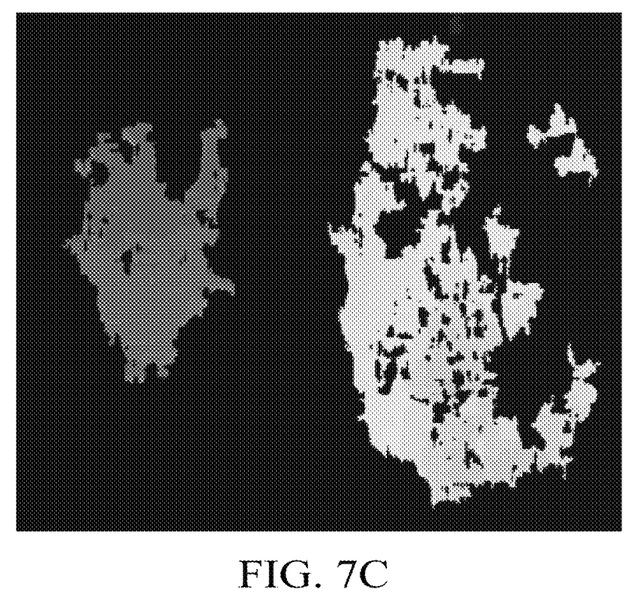
Figure 8A:
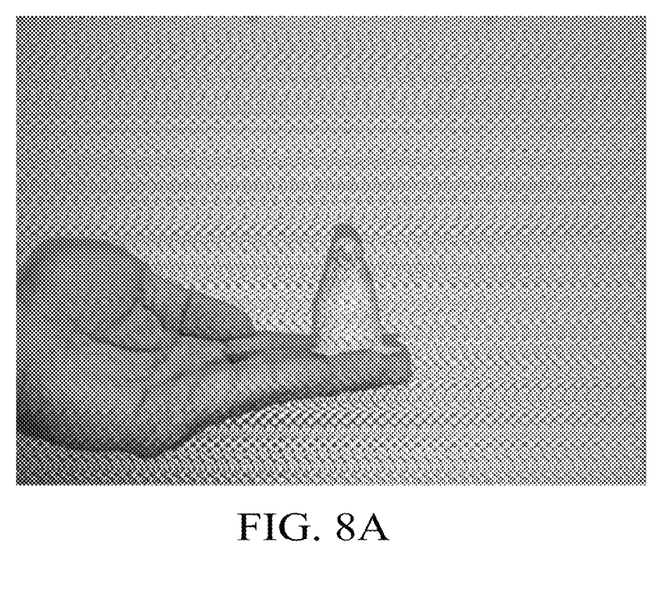
Figure 8B:
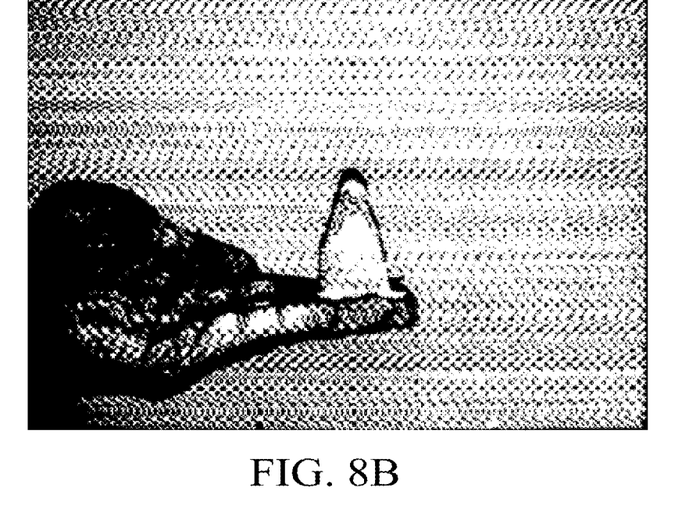
Figure 8C:
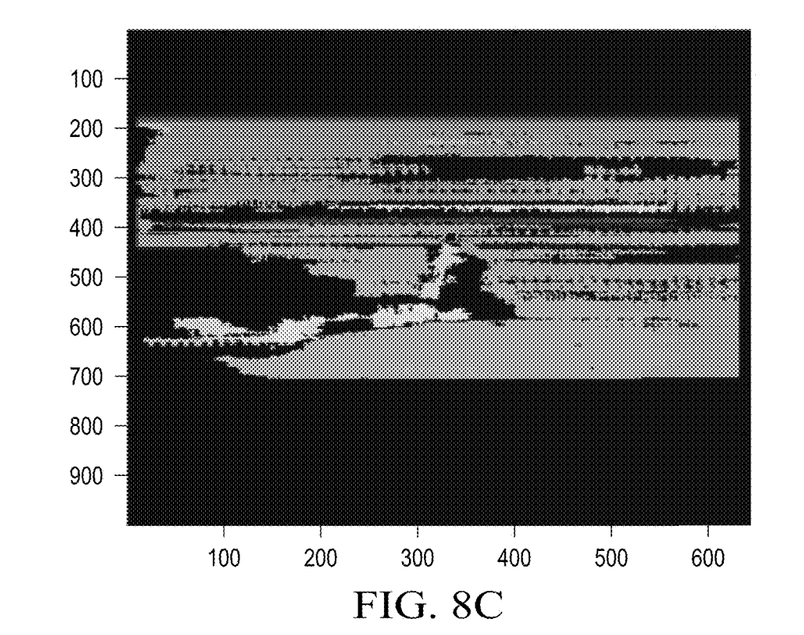

FIGS. 6A-6D are an example in which the projected binary pattern has an equal distribution of ones and zeros and a local box average filter was used to generate the local threshold image. FIG. 6A shows the projected binary pattern and FIG. 6B shows the captured image. FIG. 6C shows the binary image extracted from the captured image of FIG. 5B use an adaptive threshold. FIG. 6D shows the depth map calculated by matching the binary image with the projected binary pattern image. FIGS. 8A-8C show the result of using a global threshold rather than an adaptive threshold for the extraction of the binary image. FIG. 8A is the captured image, i.e., the image of FIG. 6A. FIG. 8B shows the binary image extracted from the captured image of FIG. 8A using a global threshold. FIG. 8C shows the depth map calculated by matching the binary image with the projected binary pattern image.

Note that the depth map of FIG. 6D is much better than that of FIG. 8C. FIG. 6B was captured under normal room lighting conditions with a measured ambient light of 280 lx. The pattern on the white object on the hand is oversaturated and the details are lost using a global threshold. Further, the pattern on the hand is lost when a global threshold is used due to low SNR and sub-surface scattering.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the extracted binary image has ones in locations where the corresponding pixel value is greater than its local threshold value and has zeros in locations where the corresponding pixel value is less than or equal to its local threshold value. One of ordinary skill in the art will understand embodiments in which the extracted binary image has ones in locations where the corresponding pixel value is greater than or equal to its local threshold value and has zeros in locations where the corresponding pixel value is less than its local threshold value. Further, one of ordinary skill in the art will understand embodiments in which the meaning of ones and zeros in the binary image is reversed, e.g., pixels values above local threshold values are indicated as zeros and pixel values below local threshold values are indicated as ones.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:
1. A method of image processing in a structured light imaging system, the method comprising:
   receiving a captured image of a scene, wherein the captured image is captured by a camera of a projector-camera pair in the structured light imaging system, and wherein the captured image comprises a binary pattern projected into the scene by the projector;

rectifying the captured image to generate a rectified captured image;

applying a bilateral filter to the rectified captured image to generate a local threshold image, wherein the local threshold image comprises a local threshold value for each pixel in the rectified captured image;

extracting a binary image from the rectified captured image wherein a value of each location in the binary image is determined based on a comparison of a value of a pixel in a corresponding location in the rectified captured image to a local threshold value in a corresponding location in the local threshold image.

2. The method of claim 1, wherein extracting a binary image comprises setting a location in the binary image to one when a value of a pixel in a corresponding location in the rectified captured image is greater than a local threshold value in a corresponding location in the local threshold image and setting the value of the location in the binary image to zero when the value of the pixel is less than the local threshold value.

3. The method of claim 1, wherein the bilateral filter generates each local threshold value as a local mean of a corresponding pixel in the rectified image.

4. The method of claim 1, wherein an operation by the bilateral filter to generate the local threshold value is dependent on a distribution of binary numbers in the projected binary pattern.

5. The method of claim 4, wherein the bilateral filter generates each local threshold value as a local mean of a corresponding pixel in the rectified image when the distribution of the binary numbers in the projected binary pattern is equal.

6. The method of claim 1, wherein a kernel size of the bilateral filter is dependent on an information density in the projected binary pattern.

7. The method of claim 1, further comprising:
performing a matching algorithm to match the binary image to the binary pattern;
determining a disparity map based on the matching algorithm.

8. The method of claim 7, further comprising performing triangulation to determine a 3D point cloud based on disparities in the disparity map.

9. A structured light imaging system comprising:
a binary pattern projector to project a binary pattern;
an image capture component to capture an image with the binary pattern;
a rectifier component coupled to the image capture component to generate a rectified captured image;
a bilateral filter coupled to the rectifier component to generate a local threshold image, wherein the local threshold image comprises a local threshold value for each pixel in the rectified captured image; and
a binary image extractor to extract a binary image from the rectified captured image, wherein a value of each location in the binary image is determined based on a comparison of a value of pixel in a corresponding location in the rectified captured image to a local threshold value in a corresponding location in the local threshold image;
means for performing a matching algorithm to match the binary image to the binary pattern by measuring a Hamming distance;
means for determining a disparity map based on the matching algorithm; and
means for performing triangulation to determine a 3D point cloud based on disparities in the disparity map.

10. The structured light imaging system of claim 9, wherein extracting a binary image comprises setting a location in the binary image to one when a value of a pixel in a corresponding location in the rectified captured image is greater than a local threshold value in a corresponding location in the local threshold image and setting the value of the location in the binary image to zero when the value of the pixel is less than the local threshold value.

11. The structured light imaging system of claim 9, wherein the bilateral filter generates each local threshold value as a local mean of a corresponding pixel in the rectified image.

12. The structured light imaging system of claim 9, wherein an operation by the bilateral filter to generate the local threshold value is dependent on a distribution of binary numbers in the projected binary pattern.

13. The structured light imaging system of claim 12, wherein the bilateral filter generates each local threshold value as a local mean of a corresponding pixel in the rectified image when the distribution of the binary numbers in the projected binary pattern is equal.

14. The structured light imaging system of claim 9, wherein a kernel size of the bilateral filter is dependent on an information density in the projected binary pattern.

15. The structured light imaging system of claim 9, further comprising a controller to:
perform a matching algorithm to match the binary image to the binary pattern;
determine a disparity map based on the matching algorithm.

16. The structured light imaging system of claim 15, wherein the controller further performing triangulation to determine a 3D point cloud based on disparities in the disparity map.

17. A non-transitory computer-readable medium comprising instructions that, when executed by one or more processors cause the one or more processors to:
receive a captured image of a scene, wherein the captured image is captured by a camera of a projector-camera pair in a structured light imaging system, and wherein the captured image comprises a binary pattern projected into the scene by the projector;
rectify the captured image to generate a rectified captured image;
apply a bilateral filter to the rectified captured image to generate a local threshold image, wherein the local threshold image comprises a local threshold value for each pixel in the rectified captured image; and
extract a binary image from the rectified captured image wherein a value of each location in the binary image is determined based on a comparison of a value of pixel in a corresponding location in the rectified captured image to a local threshold value in a corresponding location in the local threshold image.

18. The computer-readable medium of claim 17, wherein the instructions that cause the one or more processors to extract a binary image include instructions that cause the one or more processors to set a location in the binary image to one when a value of a pixel in a corresponding location in the rectified captured image is greater than a local threshold value in a corresponding location in the local threshold image and setting the value of the location in the binary image to zero when the value of the pixel is less than the local threshold value.

19. The computer-readable medium of claim 17, wherein the bilateral filter generates each local threshold value as a local mean of a corresponding pixel in the rectified image.

20. The computer-readable medium of claim 17, wherein an operation by the bilateral filter to generate the local threshold value is dependent on a distribution of binary numbers in the projected binary pattern.

21. The computer-readable medium of claim 20, wherein the bilateral filter generates each local threshold value as a local mean of a corresponding pixel in the rectified image when the distribution of the binary numbers in the projected binary pattern is equal.

22. The computer-readable medium of claim 17, wherein a kernel size of the bilateral filter is dependent on an information density in the projected binary pattern.

23. The computer-readable medium of claim 17, wherein the instructions further cause the one or more processors to:
   perform a matching algorithm to match the binary image to the binary pattern; and
   determine a disparity map based on the matching algorithm.

24. The computer-readable medium of claim 23, wherein the instructions further cause the one or more processors to perform triangulation to determine a 3D point cloud based on disparities in the disparity map.

* * * * *